(No Model.)

H. D. PERKY.
MACHINE FOR THE MANUFACTURE OF FOOD PRODUCTS FROM CEREALS.

No. 521,810. Patented June 26, 1894.

WITNESSES:
Geo. M. Anderson
Phil. C. Masi.

INVENTOR
Henry D. Perky
BY E. W. Anderson
his ATTORNEY.

THE NATIONAL LITHOGRAPHING COMPANY,
WASHINGTON, D. C.

UNITED STATES PATENT OFFICE.

HENRY D. PERKY, OF DENVER, COLORADO, ASSIGNOR TO THE CEREAL MACHINE COMPANY, OF COLORADO.

MACHINE FOR THE MANUFACTURE OF FOOD PRODUCTS FROM CEREALS.

SPECIFICATION forming part of Letters Patent No. 521,810, dated June 26, 1894.

Application filed July 7, 1893. Serial No. 479,850. (No model.)

*To all whom it may concern:*

Be it known that I, HENRY D. PERKY, a citizen of the United States, and a resident of Denver, in the county of Arapahoe and State of Colorado, have invented certain new and useful Improvements in Machines for the Manufacture of Food Products from Cereals; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
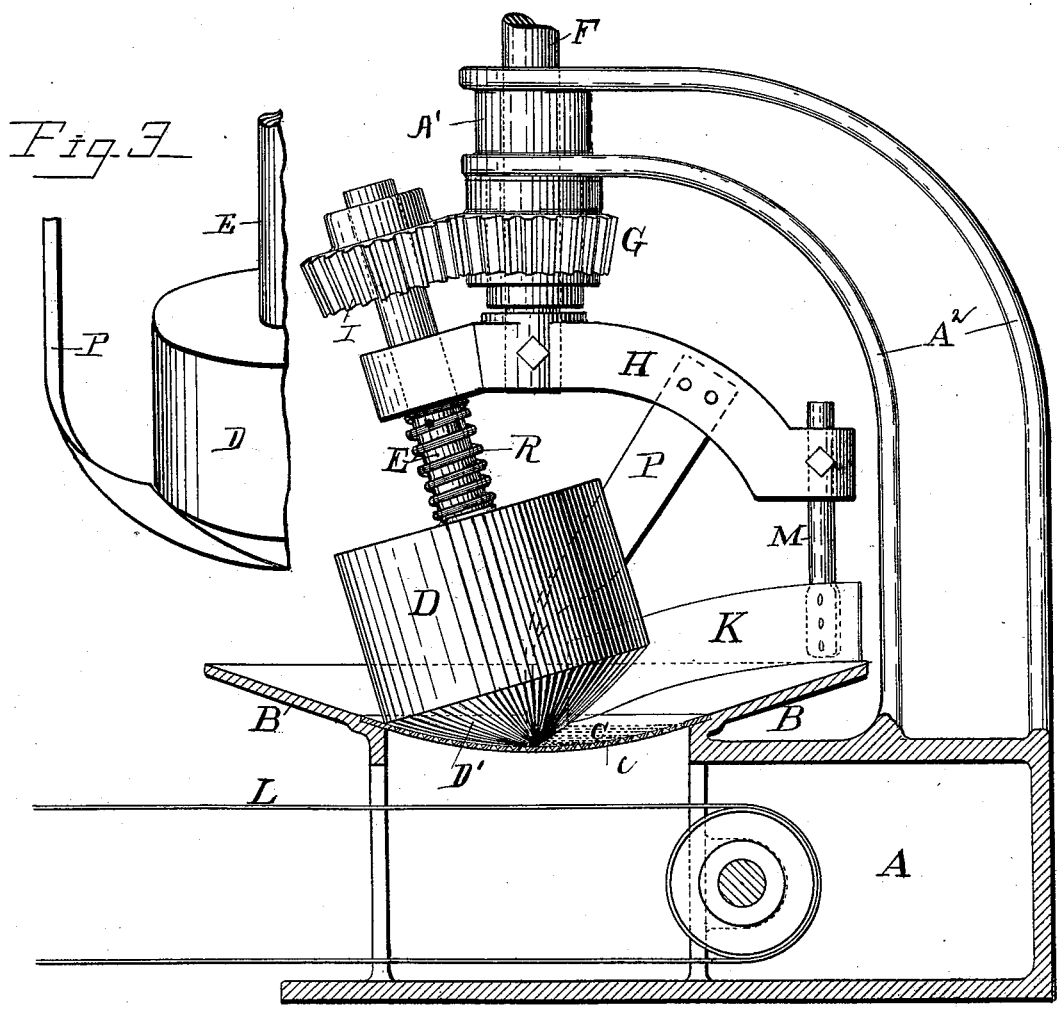
Figure 2:

Figure 1 of the drawings is an elevation partly in section showing the invention. Fig. 2 is a detail sectional view of the bottom plate of the hopper and Fig. 3 is a partial view of the cylinder with its scraper.

This invention has relation to certain new and useful improvements in machines for the manufacture of food products from cereals, and it consists in the novel construction and combination of parts, all as hereinafter specified and pointed out in the appended claims.

The object I have in view is the production of a simple, efficient, and practical machine for the reduction of cereals into an edible, wholesome and palatable food product in a convenient and desirable form.

Referring to the accompanying drawings, the letter A designates a supporting frame of any suitable construction.

B is a circular concave hopper supported on the frame, and having its bottom portion formed by a plate C of metal, in circular form, and provided with a series of perforations c.

D is a cylinder with a spheroidal or conical base D' working in contact with the plate C and carried by a shaft E, extending obliquely upwardly and through one end portion of a cross arm H. At the upper end portion of said shaft is a gear wheel I which meshes with a similar wheel G rigidly secured to a part A' of the frame above the hopper and supported by arms A². The part A' of the frame forms a bearing for a vertical shaft F which at its lower portion carries the cross arm H, by which arrangement upon rotation of the shaft the cylinder D is caused not only to rotate on its own axis, but also to revolve about the axis of the said shaft F.

K is a feed scraper which is carried by an arm M adjustably supported by the opposite end portion of the arm H from that which carries the shaft E.

The operation of the machine is as follows: The grain being first boiled, steamed, soaked or steeped, and the outer shell or hull being removed, when desired, is placed or fed into the hopper B. The machine being set in motion, the scraper K forces the grain under the face of the cylinder D, when it is crushed and forced by said cylinder through the perforations c in the plate C. These perforations are so formed as to be much wider at the bottom than at the top, the rim g at the top having a thin edge. The effect of this form of the perforation is that the crushed grain more readily passes through the metal sheet, and the increasing width of the perforations gives freedom to the course of the product; and thus unhampered in its passage, the two actions of the cylinder, viz., its rotation and revolution, cause it to issue upon a conveyer L or other receptacle in uniformly irregular shapes of shredded or filamentous form. This form of the product is desirable and inviting when the food is served directly in this form, and is especially valuable when the product is evaporated, as the form adds to the keeping qualities, preventing heating and the consequent propagation of larva as in flour, meal, and other compact bodies of cereal products. A scraper P carried by the cross arm H acts against the rotating face of the cylinder base for the purpose of removing adhesive particles of the grain or product. The pressure of the cylinder against the plate C may be regulated by means of a tension spring R, or cylinders of different weights may be employed. The spring is not essential where the cylinder is of the proper weight.

Having thus described my invention, what I believe to be new, and desire to secure by Letters Patent, is—

1. In a machine for treating cereals, the combination of the frame, the hopper, its perforated bottom plate, the cylinder having a spheroidal or conical base working in contact with said plate, and capable of a rotary and a revolving movement, and a feed scraper, substantially as specified.

2. In a machine for treating cereals, the combination of the frame, the hopper, its bottom plate having perforations therethrough wider at the bottom than at the top, the cylinder having a spheroidal or conical base in contact with said bottom plate, its oblique shaft, means for imparting a rotary and a revolving movement to said shaft and cylinder, the feed scraper, and the scraper P, substantially as specified.

3. In a machine for treating cereals, the combination of the frame, the perforated hopper, the cylinder having a spheroidal or conical base, its oblique shaft, the gear wheel on said shaft, the stationary gear wheel on the frame, the vertical driving shaft, the cross arm carried by said driving shaft, and carrying said oblique shaft, and the feed and cylinder scrapers carried by said cross arm, substantially as specified.

In testimony whereof I affix my signature in presence of two witnesses.

HENRY D. PERKY.

Witnesses:
 THOS. H. HARDCASTLE,
 T. ARTHUR YOUNG.